Oct. 17, 1967  M. O. GROAT  3,347,209
APPARATUS FOR HANDLING STACKED ARTICLES
Filed April 2, 1965

INVENTOR.
Marshall O. Groat
BY Jennings, Carter & Thompson
Attorneys

United States Patent Office 3,347,209
Patented Oct. 17, 1967

3,347,209
APPARATUS FOR HANDLING STACKED ARTICLES
Marshall O. Groat, Fort Payne, Ala., assignor to Kingsberry Homes Corporation, a corporation of Delaware
Filed Apr. 2, 1965, Ser. No. 445,075
3 Claims. (Cl. 118—500)

ABSTRACT OF THE DISCLOSURE

Apparatus for supporting stacked plank-like members having vertically spaced movable members with laterally projecting support members carried by the lowermost movable member. Elongated, vertical members connect the movable members to each other and extend transversely of the edges of the plank-like members. Tapered edges are on the vertical members to engage the edges of the stacked members permitting a coating of substantially the entire surface of the adjacent edges of the plank-like members.

---

Figure 1:
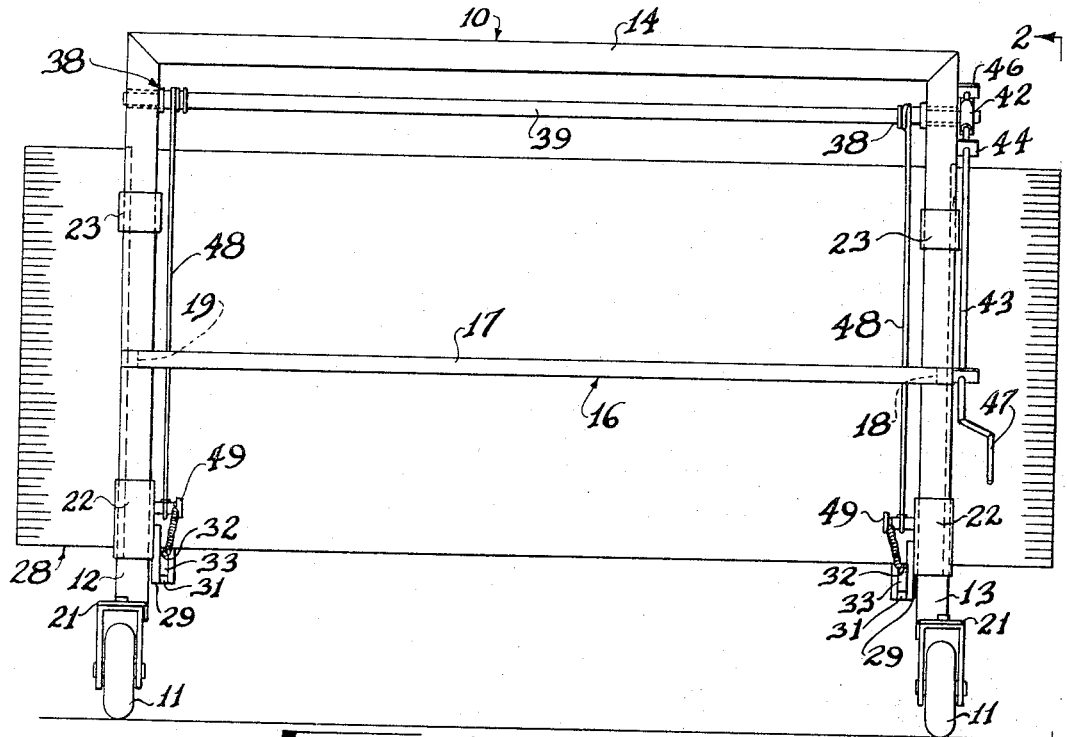

This invention relates to apparatus for handling stacked articles and more particularly to apparatus for supporting stacked, plank-like members in position for the edges thereof to receive coatings, such as paint or the like.

An object of my invention is to provide apparatus for handling stacked articles wherein the stacked articles are picked up as a unit and then transferred to another location or locations where coatings may be applied to the edges of the stacked articles without having to move the articles relative to each other during the time of transfer or during the application of the coating.

A more specific object of my invention is to provide apparatus for handling stacked, plank-like articles wherein the articles are held in stacked relationship to each other by elongated members having tapered edges which engage the adjacent edges of the stacked articles, thus permitting application of a coating to substantially the entire surface of the adjacent edges of the stacked articles.

A further object of my invention is to provide apparatus for handling stacked, plank-like articles which shall include means for picking up a stack of the articles while the stack is supported at various elevations, thus permitting the stack to be transferred to another location for receiving a coating, such as paint, and then it may be returned to its original location or to another location.

A still further object of my invention is to provide apparatus for handling stacked articles of the character designated which shall be extremely simple of construction, economical of manufacture and one which is adapted for handling stacked articles of various widths and heights.

Heretofore in the art to which my invention relates, difficulties have been encountered in applying coatings, such as paints, to the edges of plank-like members due to the fact that the stacks are stored in close relationship to each other whereby the stacks must be transferred to a suitable area for painting. Also, the edges of the plank-like members cannot be painted while in storage due to the fact that the paint would also be applied to adjacent stacks. Accordingly, there would always be a danger of applying the coating to adjacent surfaces which should not receive the coating. Difficulties have been encountered in transferring the entire stacks to painting areas due to the fact that the stacks must be removed from the apparatus at the time the paint is applied to the edges of the stacked articles. That is, the apparatus interferes with the application of the coating to the edges of the stacked articles.

In accordance with my present invention, I overcome the above difficulties by providing a translatable frame which is adapted to pick up a stack of plank-like members regardless of the elevation at which the stack is supported. The plank-like members are held in stacked relationship to each other by vertically extending members having tapered edges which engage the plank-like members in such a manner as to permit application of a coating to substantially the entire surface of the adjacent edges of the plank-like members.

Figure 2:
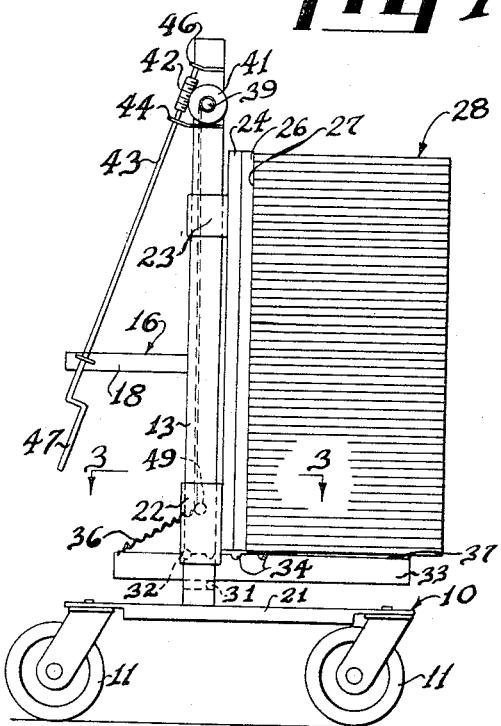
Figure 3:
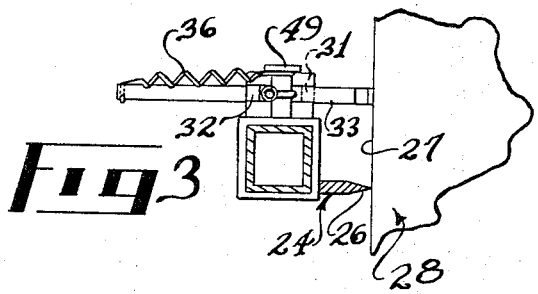

Apparatus embodying features of my invention is illustrated in the accompanying drawing, forming a part of this application, in which:

FIG. 1 is a side elevational view;
FIG. 2 is an end elevational view taken generally along line 2—2 of FIG. 1; and
FIG. 3 is an enlarged sectional view taken generally along the line 3—3 of FIG. 2.

Referring now to the drawing for a better understanding of my invention, I show a translatable frame 10 which is supported by suitable caster wheels 11 whereby the frame may be moved easily from one location to another. The frame is provided with vertically extending columns or guide members 12 and 13 at opposite ends thereof which are connected by a horizontal member 14, as shown in FIG. 1. Accordingly, the upstanding columns 12 and 13 and the horizontal member 14 define an inverted U-shaped frame. The vertical columns 12 and 13 are connected to each other intermediate the ends thereof by a suitable brace 16 which may be in the form of a U-shaped member having a base portion 17 and inturned legs 18 and 19, as shown. The lower ends of each of the vertical columns 12 and 13 is preferably connected to a horizontal support member 21 which carries the caster wheels 11, as clearly shown in FIG. 2.

Surrounding and mounted for sliding movement relative to each of the vertical guide members 12 and 13 is a lower sleeve-like movable member 22. Surrounding and mounted for sliding movement relative to the vertical guide members 12 and 13 above the movable member 22 are sleeve-like movable members 23.

The movable sleeve-like members 22 and 23 at each end of the frame 10 are connected to each other by a vertical member 24 having a tapered edge 26 which is in position to engage the adjacent edges 27 of a stack of plank-like members indicated generally at 28. Accordingly, the sleeve-like members 22 and 23 carried by the vertical guide member 12 are connected to each other by one elongated member 24 while the sleeve-like members 22 and 23 carried by the vertical guide member 13 are connected to each other by another elongated member 24.

Secured to the inner surface of each of the sleeve-like movable members 22 is a depending bracket 29. Secured to and extending inwardly of each bracket 29 is a lower support pin 31. Secured to and projecting inwardly of each bracket 29 at an elevation above the support pin 31 is an upper pin 32. As shown in FIGS. 2 and 3, the lower support pin 31 is positioned at the side of the bracket 29 adjacent the elongated member 24 while the upper pin 32 is positioned adjacent the opposite side thereof. Extending between each pair of pins 31–32 is a horizontally extending support member 33. Since the lower support pin 31 is not in vertical alignment with the upper pin 32, downward pressure on the outer end of the horizontal support member 33 causes the pins 31 and 32 to engage opposite sides of the member 33 in spaced relation to each other to thereby support the member 33, as shown in FIG. 2.

To vary the effective length of the horizontal support member 33, upwardly opening recesses 34 are provided in the upper surface of the horizontal support member 33 in spaced relation to each other and in position to receive the pin 32, as shown in FIG. 2. Accordingly, the horizontal support member 33 may be moved inwardly or outwardly relative to the stack of planks 28 whereby the pin 32 engages selected ones of the upwardly opening recesses 34 to thereby lock the horizontal support member 33 in selected positions to accommodate planks of various widths. The inner end of each of the horizontal support members 33 is connected to its associated sleeve-like member 22 by a tension spring 36 whereby the horizontal support member 33 is held firmly in place prior to engagement with the undersurface of a stack of planks 28. To assure that the stack of planks 28 are in firm engagement with the tapered edges 26 of the elongated members 24, an outer portion, indicated at 37 of the horizontal support member 33 is elevated relative to the innermost portion thereof which engages the stack of planks 28. The elevated portion 37 may be provided by securing a suitable spacer member to the outer, upper portion of the horizontal support member 33 or by forming the elevated portion 37 as an integral part of the horizontal support member 33.

To elevate the movable members 22 and 23 and the horizontal support member 33 carried thereby, I mount a winch unit 38 adjacent the upper end of each of the vertical guide members 12 and 13, as shown in FIG. 1. The winch units 38 are mounted on a common shaft 39 which is mounted for rotation in suitable bearings provided in the vertical guide members 12 and 13. A worm gear 41 is mounted on the shaft 39 outwardly of the vertical guide member 13 and is driven by a worm 42. As shown in FIGS. 1 and 2, the worm 42 is mounted on a shaft 43 which in turn is mounted for rotation in suitable bearings provided in outwardly projecting brackets 44 and 46. A crank handle 47 is formed integrally with the lower end of the shaft 43 whereby the worm 42 and the worm gear 41 connected thereto may be rotated in opposite directions to actuate the winch units 38. Each winch unit 38 is provided with a depending flexible member 48 which is connected to its subjacent sleeve-like guide member 22 by a suitable pin 49.

From the foregoing description, the operation of my improved apparatus will be readily understood. The movable members 22 and 23 are moved to their lowermost positions by rotating the crank 47 in the proper direction. The horizontal support members 33 are thus in position to move beneath a stack of plank-like articles 28. It will be understood that the stack of planks 28 would be supported by suitable means whereby there would be ample room for the horizontal support members 33 to be inserted beneath the stack 28. With the support members 33 positioned beneath the stack of plank-like members 28, the crank 47 is rotated in the proper direction to actuate the winches 38 whereby the movable members 22 and the horizontal support members 33 carried thereby are elevated to thus engage the stack of articles 28 whereby the stack is removed from its supporting means. The elevated portion 37 adjacent the outer end of the horizontal support member 33 urges the entire stack of articles 28 toward the tapered edges 26 of the vertical members 24 whereby the stack 28 remains in firm engagement therewith while it is supported on the horizontal support member.

With the stack of articles 28 thus supported, the translatable frame 10 is moved to another location where the coating is to be applied by suitable means, such as by spraying, brushing or the like. Since the tapered edges 26 engage a minimum of surface along the edges of the planks, substantially the entire surface of the edges is coated. In fact, the surface beneath the tapered edges 26 is coated to a great extent by absorption of the paint across the relatively small area contacted by the tapered edge 26. After the edges of the stack of articles 28 have been coated, the stack may then be transferred to a suitable location for drying, other treatments, or for storage. To remove the stack of articles 28 from the apparatus, the crank 47 is rotated in the proper direction to elevate the horizontal support members 33 whereby the lower surface of the stack of articles 28 is at an elevation to move over the pallet or the like used to support the same. The crank 47 is then rotated in a direction to lower the horizontal support members 33 whereby the stack of articles 28 is positioned on the support means therefor. The translatable frame 10 is then free to be moved away from the stack of articles 28.

From the foregoing, it will be seen that I have devised improved means for handling stacked articles. By providing a translatable frame, together with a horizontally extending support member which is adapted to move beneath the stack and then lift the stack off its support means, the stack may be transferred to any location for receiving a coating of paint or the like. By providing an elevated portion adjacent the outer end of the horizontal support member, the stack of articles is urged into firm engagement with the tapered edges 26 of the elongated members whereby the plank-like members are held in stacked relationship to each other as they are transferred from one location to another. Furthermore, by providing an elongated tapered edge 26 along the members 24 in position to engage the adjacent edges of the plank-like members, substantially the entire surface of the adjacent edges may be covered with the coating without having to remove the stack of planks from the apparatus.

While I have shown my invention in but one form, it will be obvious to those skilled in the art that it is not so limited, but is susceptible of various changes and modifications without departing from the spirit thereof, and I desire, therefore that only such limitations shall be placed thereupon as are specifically set forth in the appended claims.

What I claim is:

1. In apparatus for supporting stacked plank-like members in position for the edges thereof to receive coatings:
    (a) a translatable frame having spaced apart vertically extending guide members,
    (b) vertically spaced movable members slidably engaging said guide members and adapted for vertical movement relative thereto,
    (c) means to move said movable members to selected positions along said guide members,
    (d) laterally projecting support members carried by the lowermost ones of said movable members in position to support said plank-like members,
    (e) elongated, vertical members connecting said movable members to each other and disposed to extend transversely of the edges of said plank-like members, and
    (f) tapered edges on said elongated, vertical members in position to engage the adjacent edges of said stacked plank-like members and permit application of a coating to substantially the entire surface of said adjacent edges of said plank-like members.

2. In apparatus for supporting stacked plank-like members as defined in claim 1 in which the means to move said movable members to selected positions along said guide members comprises a winch unit mounted adjacent each of said guide members with each winch unit having a flexible member operatively connected to the movable members adjacent thereto.

3. In apparatus for supporting stacked plank-like members as defined in claim 1 in which the outer portions of said laterally projecting support members which support the plank-like members carry raised portions so that said outer portions of the laterally projecting support members are elevated relative to the inner portions thereof whereby said stacked plank-like members are urged toward said tapered edges.

References Cited

UNITED STATES PATENTS

| | | | |
|---|---|---|---|
| 783,699 | 2/1905 | Laffin | 187—9 |
| 851,789 | 4/1907 | Alexander | 214—10.5 |
| 1,128,119 | 2/1915 | Evans | 214—10.5 X |
| 1,538,322 | 5/1925 | Gunter | 214—10.5 X |
| 1,843,736 | 2/1932 | Remde | 214—654 |
| 2,068,825 | 1/1937 | Stevenson | 214—620 |
| 2,156,204 | 4/1939 | Stolze | 187—9 X |
| 2,239,135 | 4/1941 | Wehr | 294—67 |
| 2,598,865 | 6/1952 | Turner. | |
| 2,653,679 | 9/1953 | Hamilton. | |
| 2,788,909 | 4/1957 | Kughler | 214—731 X |

GERALD M. FORLENZA, *Primary Examiner.*

F. WERNER, *Assistant Examiner.*